United States Patent [19]

Hirshfield et al.

[11] Patent Number: 4,458,148

[45] Date of Patent: Jul. 3, 1984

[54] METHOD AND APPARATUS FOR SEPARATING SUBSTANCES OF DIFFERENT ATOMIC WEIGHTS USING A PLASMA CENTRIFUGE

[75] Inventors: Jay L. Hirshfield, Hamden; Mahadeven Krishnan, New Haven, both of Conn.

[73] Assignee: Omega-P, Inc., New Haven, Conn.

[21] Appl. No.: 276,087

[22] Filed: Jun. 22, 1981

[51] Int. Cl.³ .................. H01J 49/26; H01J 27/24; H01J 1/24
[52] U.S. Cl. ........................ 250/284; 250/423 P; 250/281; 55/3; 55/17; 55/100; 55/102
[58] Field of Search ............ 250/281, 284, 298, 423 P, 250/425; 55/3, 17, 100, 102

[56] References Cited

U.S. PATENT DOCUMENTS 3,939,354  2/1976  Janes .............................. 250/423 P
4,090,855  5/1978  Hora et al. ........................... 5/3
4,209,697  6/1980  Renner et al. .................... 250/423 P

FOREIGN PATENT DOCUMENTS 2740183  3/1979  Fed. Rep. of Germany ...... 250/281
1385325  2/1975  United Kingdom .

OTHER PUBLICATIONS

Phaneuf, "Production of High-Q Ions by Laser Bombardment Method", IEEE Trans. Nuc. Sci., NS-28 (2), Apr. 1981, pp. 1182-1185.
Hillenkamp et al., "A High-Sensitivity Laser Microprobe Mass Analyzer", Appl. Phys. 8 (4), Dec. 1975, pp. 341-348.
Winterberg, "Combined Laser Centrifugal Isotopic Separation Technique", Atomkernergie (ATKE), 30, 1977, pp. 65-66.
Bonnevier, Experimental Evidence of Element and Isotope Separation in a Rotating Plasma, Plasma Physics, vol. 13, 1971, pp. 763-774.
James and Simpson, Isotope Separation in the Plasma Centrifuge, Plasma Physics, vol. 18, 1976, pp. 289-300.
Walsh, Brand and James, Separation of Metals in a Rotating Plasma II, Physics Letters, vol. 73A, No. 2, Sep. 3, 1979, pp. 109-110.
Wijnakker and Granneman, Limitations on Mass Separation by the Weakly Ionized Plasma Centrifuge, FOM-Institute for Atomic and Molecular Physics, Jan. 14, 1980, pp. 883-893.
Lechnert, Rotating Plasmas, Royal Institute of Technology, Nuclear Fusion 11, 1971, pp. 485-533.
Siegbahn, Electron Spectroscopy—An Outlook, Journal of Electron Spectroscopy and Related Phenomena, 1974, pp. 3-97.

Primary Examiner—Alfred E. Smith
Assistant Examiner—Carolyn E. Fields
Attorney, Agent, or Firm—Armstrong, Nikaido, Marmelstein & Kubovcik

[57] ABSTRACT

The present invention is directed to a method and apparatus for centrifugally separating substances of different atomic weights. The substances to be separated are positioned in an evacuated vessel which has a longitudinal axis. A magnetic field is generated in the vessel parallel to the longitudinal axis of the vessel and a target comprised of the substances to be separated is positioned within the vessel at one end thereof. A collector is positioned at the other end of the vessel. Pulsed laser energy is focused on the substances to be separated thereby fully ionizing at least a portion of the substances and forming a plasma therefrom. Immediately following the focusing of the laser energy, a current is passed through the substances to be separated which causes further full ionization of the substances and thereby the formation of additional plasma. The ionized plasma is rotated and moved from the substances which are to be separated to a collector by the application of the magnetic field. At least a portion of the ionized substances are separated by the centrifugal force resulting from the rotation of the plasma by the magnetic field.

11 Claims, 2 Drawing Figures

RELATIVE ABUNDANCE OF COPPER/NICKEL VS. RADIUS MEASURED ON THE END PLATE COLLECTOR. (NORMALIZED TO UNITY ON AXIS)

METHOD AND APPARATUS FOR SEPARATING SUBSTANCES OF DIFFERENT ATOMIC WEIGHTS USING A PLASMA CENTRIFUGE

The U.S. Government has rights in this invention pursuant to Grant No. 81-71-CPE-79-16500, awarded by the National Science Foundation.

BACKGROUND OF THE INVENTION

1. Field of the Invention

The present invention is directed to a method and apparatus for separating substances of different atomic weights using a plasma centrifuge and more particularly to a method and apparatus wherein a laser-initiated vacuum arc, is used to fully ionize and form a plasma of the substances to be separated.

2. Description of the Prior Art

The separation of substances having different atomic weights by rotating a plasma including these substances is known in the prior art. In the prior art techniques, a neutral gas including the substances to be separated is ionized by passing an electric current therethrough. These prior art gas discharge plasmas are, however, only partially ionized. Thus, although the ionized plasma component responds to electric and magnetic fields which rotate the plasma, the drag due to the neutral atoms within and around the spinning plasma limits the rotation rates and hence, the degree of mass separation achievable in such prior art centrifuges. The neutral atom viscosity results in plasma rotation rates well below the Alfven critical velocity with corresponding low mass separation. In a partially ionized plasma, the Alfven velocity limit is reached when the rotational energy of the ions equals the ionization energy of the neutral atoms. Further energy input to the rotating plasma then goes primarily into the ionization of the residual neutrals.

Since the centrifugal force applied to the substances of different atomic weights is a function of the rotational speed the limitations on the rotational speed caused by the drag of the neutral atoms substantially reduces the centrifugal force and, therefore, the separating capability of the prior art devices.

SUMMARY OF THE INVENTION

It is the primary object of the present invention to provide a method and apparatus for the separation of substances of different atomic weights wherein the plasma including the substances to be separated is fully ionized thereby reducing drag when the plasma is rotated by the application of a magnetic force thereto.

It is a further object of the present invention to provide a method and apparatus for the separation of substances of different atomic weights using a plasma centrifuge in which the plasma is formed by focusing laser energy on the substances to be separated.

It is still another object of the present invention to provide a method and apparatus for separating substances of different atomic weights using a plasma centrifuge in which initial full ionization is effected using pulsed laser energy and at the completion of the laser pulse, an electric current is passed through the substances to be separated resulting in the further full ionization thereof.

It is still a further object of the present invention to ensure full ionization using pulsed laser energy and an electric current by effecting the ionization in a small volume or point of a target comprising the substances to be separated.

The present invention is directed to a method and apparatus for centrifugally separating substances of different atomic weights. The substances to be separated are positioned in an evacuated vessel which has a longitudinal axis. A magnetic field is generated in the vessel parallel to the longitudinal axis of the vessel and a target comprised of the substances to be separated is positioned within the vessel at one end thereof. A collector is positioned at the other end of the vessel. Pulsed laser energy is focused on the substances to be separated thereby completely ionizing at least a portion of the substances and forming a plasma therefrom. Immediately following the arrival of the laser energy, a current is passed through the substances to be separated which causes further complete ionization of the substances and thereby the formation of additional plasma. The completely ionized plasma is rotated and moved from the target of substances which are to be separated to a collector by the application of the magnetic field. At least a portion of the ionized substances are separated by the centrifugal force resulting from the rotation of the plasma by the magnetic field.

DETAILED DESCRIPTION OF THE PREFERRED EMBODIMENT

Figure 1:
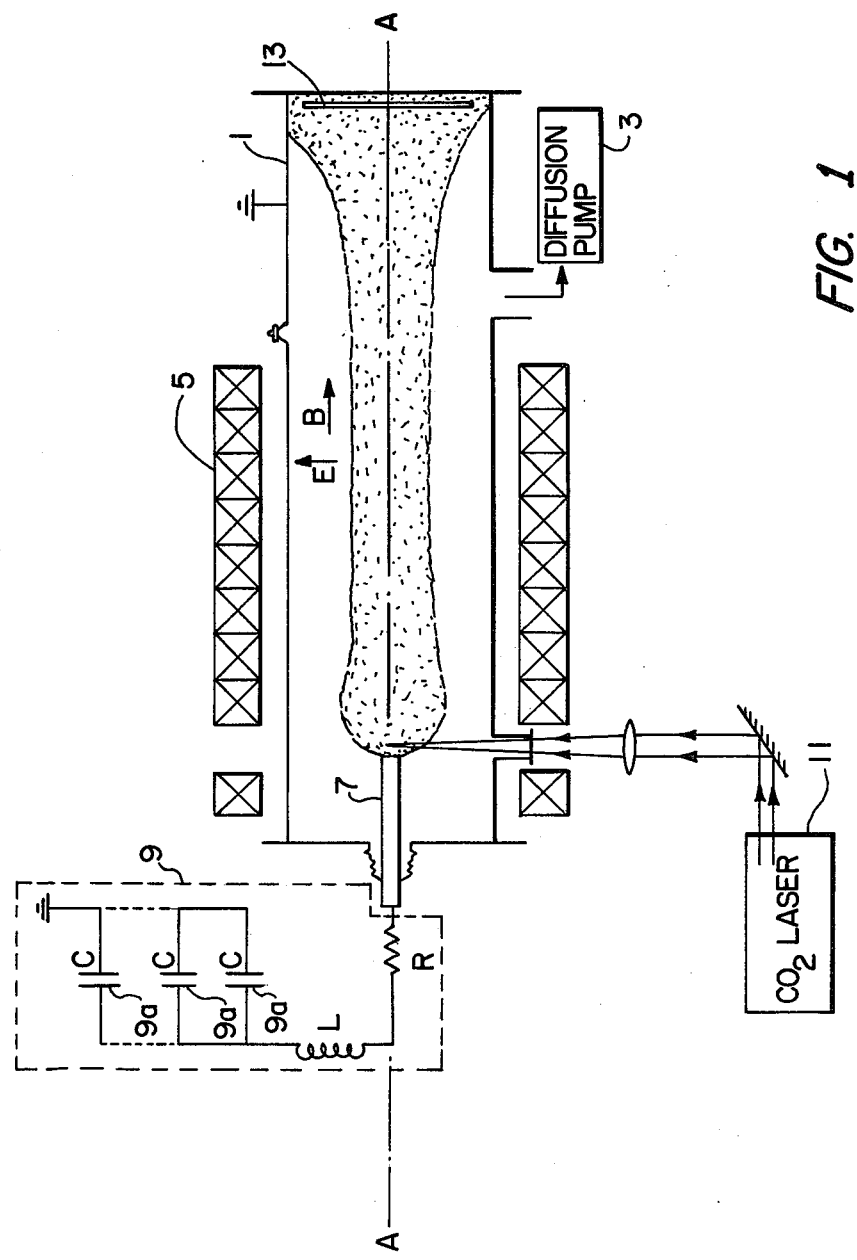
FIG. 1 is a schematic diagram of a plasma centrifuge of the present invention.

Referring to FIG. 1, a vessel 1 is evacuated using a diffusion pump 3. Electromagnetic coils 5 surround the vessel 1 which may, for example, be cylindrical in shape. The axis of the coils 5 correspond to the longitudinal axis A—A of the vessel 1. A solid target 7 including the materials to be separated is positioned at one end of the vessel 1 and one terminal of a power supply 9 is connected thereto. In the preferred embodiment, the target is a solid. The use of a solid target in a vacuum facilitates the creation of a fully ionized plasma. However, a liquid or gas target could be used. A laser 11 is focused on the target 7 so that the laser energy therefrom may be applied to the target 7.

In operation, the laser 11 is pulsed and the pulsed laser energy is focused on the target 7. The laser, may for example, be a pulsed $CO_2$ laser. The laser pulse causes a portion of the target to ionize and form a plasma. At the end of the laser pulse, the charge stored on capacitors 9a of capacitor discharge power supply 9 is discharged through the target 7 causing a current to flow therethrough. This current further ionizes a portion of the substances to be separated and thereby further increases the plasma. At the end of the current discharge from power supply 9 through target 7, the laser 11 is pulsed again and then the power supply is discharged again in repeating cycles.

The plasma creates an electric field E having a direction radially inward. Further, the flow of current across the magnetic field B produced by the magnetic coils 5 produces a Lorentz body force on the plasma which acts to spin or rotate the plasma column about the longitudinal axis A—A. Further, the magnetic field confines the plasma to the central portion of the vessel and still further causes the plasma to flow towards end plate collector 13. Because the plasma is spinning or rotating, the substance of a heavier atomic weight will tend to move radially outward as a result of a greater centrifugal force being applied thereto as compared to the substance of the lighter atomic weight. Thus, when the plasma strikes the end plate collector, there will be a greater concentration of the heavier substance towards the radially outward portion of the end plate collector and a resulting greater concentration of the lighter substance at the radially inward portion of the end plate collector. Separation is thereby effected by increasing concentrations of one of the substances as compared to another of the substances at differing radial portions of the end plate collector.

Figure 2:
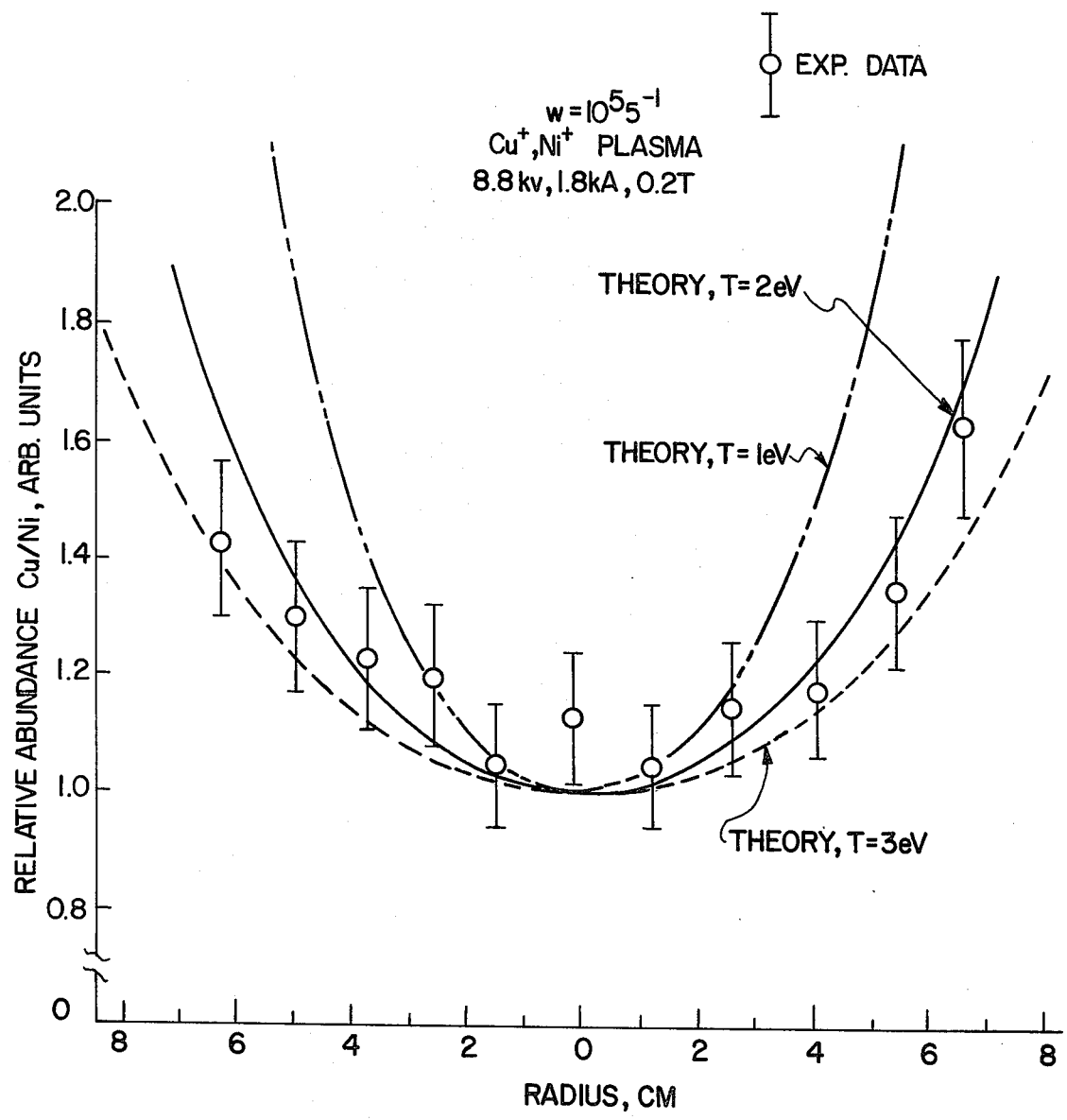
FIG. 2 is a graph showing the relative abundance of two substances having different molecular weights versus the radius measured on the end plate collector.

FIG. 2 is a graph showing the relative abundance of a heavier material to a lighter material at various radii on an end plate collector. The three curves shown are theory for different values of plasma temperature. The curves are normalized to unity on the axis of the end plate collector which is coincident with the longitudinal axis of the vessel. As can be seen from the curve, the concentration of the heavier material increases as the radius increases. Conversely, the concentration of the lighter material would increase as the radius approaches the axis.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for centrifugally separating substances of different atomic weights, said apparatus comprising:
   (a) vessel means having a longitudinal axis;
   (b) vacuum means for creating a vacuum in said vessel means;
   (c) magnetic field generating means for generating a magnetic field in said vessel means, parallel to the longitudinal axis of said vessel means;
   (d) target means comprised of said substances, said target means being positioned within said vessel means at one end thereof;
   (e) collector means positioned within said vessel means at the other end thereof;
   (f) plasma initiation means operably associated with said target means for ionizing at least a portion of said substances and forming a plasma therefrom; and
   (g) power supply means connected to said target means for providing an electric current thereto wherein the current flow through said target means causes the further ionization of said substances to fully ionize said substances and form a fully ionized plasma therefrom;
   (h) wherein said fully ionized plasma is rotated and moved from said target means to said collector means by said magnetic field such that at least a portion of said ionized substances are separated by the centrifugal force resulting from the rotation thereof.

2. An apparatus as set forth in claim 1, wherein said plasma initiation means is a pulsed laser.

3. An apparatus as set forth in claim 2, wherein said power supply means provides a current pulse to said target means and wherein said laser provides a laser pulse to said target means at predetermined intervals, said predetermined intervals corresponding to the time when said power supply means is recharged.

4. An apparatus as set forth in any one of claims 1–3, wherein said magnetic field generating means comprises at least one electromagnetic coil surrounding said vessel means, wherein the axis of said coil is coincident with the longitudinal axis of said vessel means.

5. An apparatus as set forth in claim 4, wherein said at least one coil is a plurality of coils.

6. An apparatus as set forth in any one of claims 1–3, wherein said power supply means comprises a charged capacitor network.

7. An apparatus as set forth in any one of claims 1–3, wherein said collector means is a plate.

8. An apparatus as set forth in any one of claims 1–3, wherein said target means is a solid.

9. A method of separating substances of different atomic weights, said method comprising:
   (a) placing said substances in a vacuum;
   (b) applying energy to said substances for partially ionizing a portion thereof to form a plasma;
   (c) passing a current through said substances and the partially ionized portion thereof for further ionizing said partially ionized substances and thereby forming a fully ionized plasma therefrom;
   (d) applying a magnetic field to said ionized plasma for rotating at least said fully ionized plasma and moving at least said fully ionized plasma in a direction away from the un-ionized portion of said substances, wherein the rotation of at least said fully ionized plasma centrifugally separates at least a portion of said substances; and
   (e) depositing said centrifugally separated ionized plasma on a collector.

10. A method as set forth in claim 9, wherein said applying energy to said substances comprises focusing a laser onto said substances.

11. A method as set forth in any one of claims 9 or 10, wherein passing a current through said substances comprises discharging a capacitor means through said substances.

* * * * *

UNITED STATES PATENT AND TRADEMARK OFFICE
CERTIFICATE OF CORRECTION

PATENT NO. : 4,458,148
DATED : July 3, 1984
INVENTOR(S) : Jay L. Hirshfield, et al.

It is certified that error appears in the above-identified patent and that said Letters Patent is hereby corrected as shown below:

Column 1, line 9, insert the following information:

The invention identified above is a subject invention under 35 U.S.C. 200, et seq., and the Standard Patent Rights Clause at 37 C.F.R. 401.14 or F.A.R. 52.227-11, which are included among the terms of the above-identified grant/contract award from the Public Health Service/National Institutes of Health.

Signed and Sealed this

Thirteenth Day of April, 1999

Q. TODD DICKINSON

*Attest:*

*Attesting Officer*   *Acting Commissioner of Patents and Trademarks*